United States Patent [19]
Hodges et al.

[11] 3,742,330
[45] June 26, 1973

[54] CURRENT-MODE D. C. TO A. C. CONVERTERS

[75] Inventors: Leonard O. Hodges, Costa Mesa; Larry R. Suelzle, Los Altos, both of Calif.

[73] Assignee: Delta Electronic Control Corporation, Costa Mesa, Calif.

[22] Filed: Sept. 7, 1971

[21] Appl. No.: 178,112

[52] U.S. Cl. .................. 321/9 A, 321/45 R, 323/4, 323/DIG. 1
[51] Int. Cl. ......................................... H02m, G05f
[58] Field of Search .................. 321/2, 4, 5, 9 A, 321/11, 45 R; 323/1, 4, 7, 8, DIG. 1

[56] References Cited
UNITED STATES PATENTS

| | | | |
|---|---|---|---|
| 3,487,286 | 12/1969 | Persson | 321/2 |
| 3,302,092 | 1/1967 | Bloom et al. | 323/DIG. 1 |
| 3,614,590 | 10/1971 | Kernick | 321/9 A |
| 3,432,737 | 3/1969 | Hunter et al. | 321/45 R |
| 3,581,098 | 5/1971 | Hoover | 321/2 |

FOREIGN PATENTS OR APPLICATIONS

| | | | |
|---|---|---|---|
| 1,216,415 | 12/1970 | Great Britain | 321/4 |

*Primary Examiner*—William H. Beha, Jr.
*Attorney*—White, Haefliger and Bachand

[57] ABSTRACT

Circuitry for controlling a load current, without feedback, comprises:
a. a source of substantially constant current $I_1$,
b. power switching circuitry connected to receive $I_1$ and to produce an output current a version of which is to be supplied to a load, and
c. control means connected to control the power switching circuitry so as to cause the output current to switch between predetermined positive and negative values, and a value intermediate thereto.

12 Claims, 4 Drawing Figures

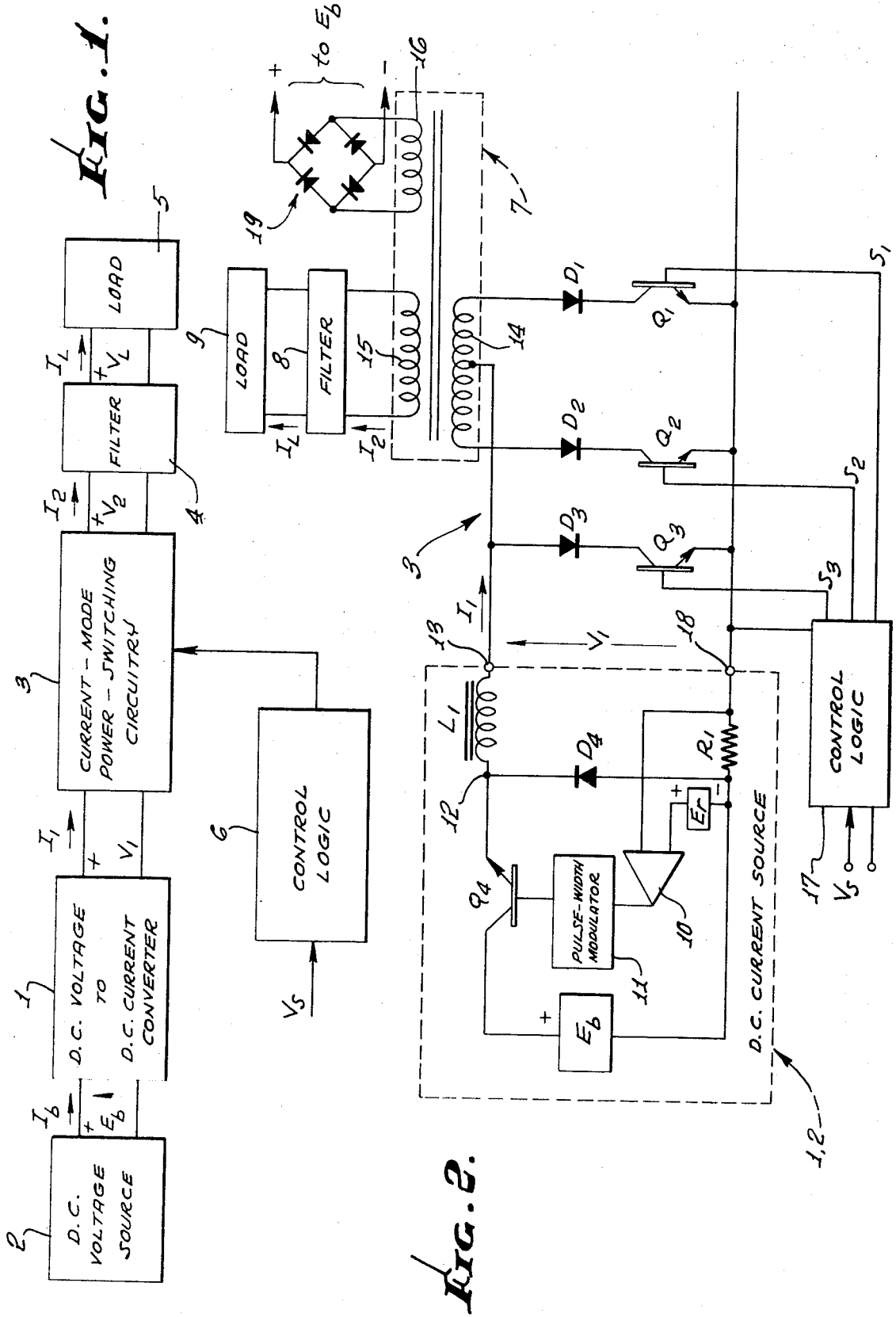

CURRENT-MODE D. C. TO A. C. CONVERTERS

BACKGROUND OF THE INVENTION

This invention relates generally to current control in a load circuit, and more particularly concerns the attainment of such control without the use of direct feedback control from the load circuit.

When electrical power is being fed to a device there are instances when it is desirable that the current, rather than the voltage, be the controlled variable. For example, the magnetostrictive sonic transducer, which is an electromechanical device, will produce acoustic energy with less harmonic distortion when the electrical input is a current-controlled signal. A current-controlled source is said to exhibit a high output impedance. Such a source is often referred to as a "current source".

Most of the basic sources of electrical power (batteries, motor generators, etc.) have low output impedances and are often referred to as "voltage sources". This means that the source presents an electrical potential (voltage) which remains relatively constant for the useful range of current drawn from the source, and the current which flows depends on the particular load impedance connected to the voltage source.

The ideal current source supplies a current which remains constant when the load impedance is varied. In practice, however, there will be a maximum impedance and a corresponding maximum voltage for which the source can perform properly.

Historically, when electrical switching devices such as transistors were used to generate an alternating voltage from a direct voltage, the description D.C. to A.C. inverter was employed. Since D.C. refers to direct current and A.C. refers to alternating current this was somewhat of a misnomer since the inverters typically operated from a direct voltage source (eg., battery) and generated a source of alternating voltage. The output current was an alternating current whose magnitude and phase depended on the particular load impedance. The typical inverter approximates a "voltage source".

When it has been necessary to control the current to a load and when the basic power source was a voltage source, the classical method employed involved measuring or monitoring the current flowing in the load circuit and using a feedback control system to adjust the output voltage of the source to obtain or maintain the desired load current. The feedback control was used to raise the effective output impedance of the voltage source. When a rapidly varying current is desired, or when the load impedance varies rapidly, the feedback control must have adequate gain-bandwidth characteristics to insure proper current control. In many instances, the onset of instabilities in the feedback control limit the frequency range of the current control severely.

SUMMARY OF THE INVENTION

It is a major object of the invention to provide improved circuitry for controlling current in a load circuit, but without the need for direct feedback control from the load circuit. Basically, the invention is embodied in the combination that includes: a source of substantially constant current $I_1$; power switching circuitry connected to receive $I_1$ and to produce an output current, a version of which is to be supplied to the load; and, control (logic) means connected to control the power switching circuitry so as to cause the output current to switch between predetermined positive and negative values, and a value intermediate thereto.

More specifically, the power switching circuitry may advantageously include two parallel paths having $I_1$ receiving inputs, each path including gate and diode means, the gate means having ON and OFF states governed by the control means so that one path conducts $I_1$ output current when the other path is non-conductive, and so that the other path conducts $I_1$ output current when the one path in non-conductive. As will be seen a third path having an $I_1$ receiving input may be connected in parallel relation with the two parallel paths, the third path including gate and diode means, the latter also having ON and OFF states subject to control so that the third path conducts $I_1$ shunt current when the first and second paths are non-conductive, and so that the third path in non-conductive when either of the first and second paths is conductive. Typically, the three paths are connected between the $I_1$ source and a common terminal.

Further, an output transformer may have a center-tapped input winding to which the source $I_1$ current and the first two paths are connected, and an output winding to which the load is connected, a filter also to be connectible between the output winding and load; also, the output transformer may have a third winding to which limiting voltage is applicable to limit the voltage produced across the output winding.

In another embodiment of the invention, the first and second paths may respectively include first and second sections, and third and fourth sections, to provide a bridge between the input $I_1$ and the output to the load; and each section may include controllable gate means, and diode means, as will appear.

These and other objects and advantages of the invention, as well as the details of illustrative embodiments, will be more fully understood from the following description and drawings, in which:

DRAWING DESCRIPTION

FIG. 1 is a block diagram;
FIG. 2 is an electrical circuit diagram;
FIG. 3 is a wave-form diagram; and
FIG. 4 is a diagram of a modified electrical circuit.

DETAILED DESCRIPTION

Figure 3:
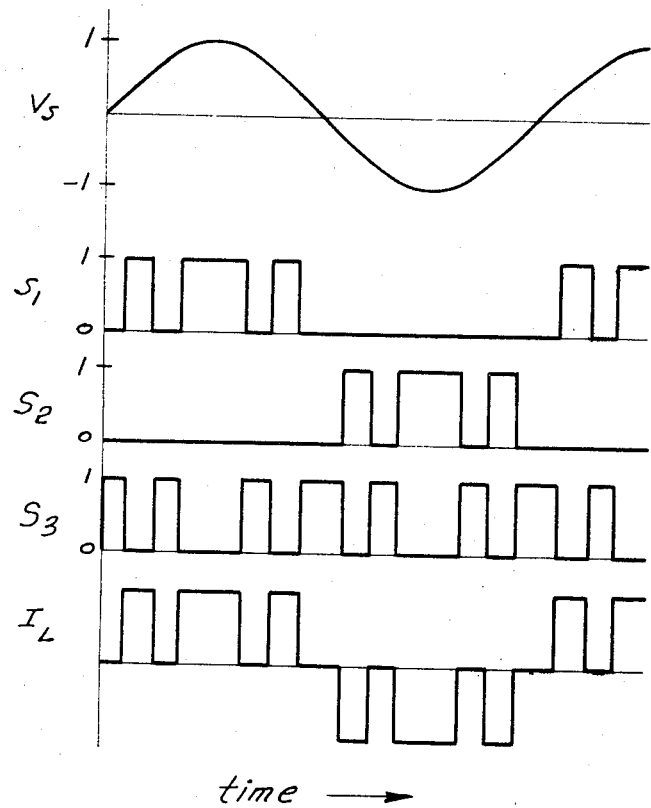

Fundamental concepts of the invention can be described with the aid of FIG. 1. Block 1, labled D.C. Voltage to D.C. Current Converter, represents circuitry which generates a constant current $I_1$ from an input voltage source 2. The output voltage $V_1$ is typically restricted to remain within certain maximum limits. Within these limits the output current $I_1$ remains constant and independent of $V_1$. Since the circuitry of block 1 is required only to generate a D C. current control characteristic, and is not required to vary the magnitude of the output current quickly, the feedback control applied to a low-impedance source will typically be employed for this block (a typical circuit configuration will be presented later). Block 3, the Current-Mode Power-Switching Circuitry, represents circuitry which in one state of operation passes current $I_1$ to the filter 4 and load 5, and in another state of operation shorts its input terminals and open-circuits the terminals to the filter 4 and load 5. For an alternating current to be generated, the first state described above is divided into two sub-states in which the polarity of the output current $I_2$ can be selected to be positive or negative.

The circuitry of Block 6, the Control Logic, selects the particular sequence of the three possible output states for $I_2$: $I_2$ equal to $+I_1$, 0, or $-I_1$. By selecting the appropriate sequence of states the output current $I_2$ can be controlled analogously to the pulse duration, pulse position, pulse width modulation techniques usually used in the control of voltage. The control logic 6 typically generates a switching control sequence that produces an output current $I_2$ whose development as a function of time approximates the reference signal $V_s$. Filter 4 is typically employed when it is desirable to attenuate the higher-frequency harmonics and distortion products produced by the switching ON and OFF of the current into the filter 4 and load 5 circuits.

Accordingly, the load current control circuitry may be considered to include:

a. a source of substantially constant current $I_1$, b. power switching circuitry connected to receive $I_1$ and to produce an output current, a version of which is to be supplied to a load, and c. control means connected to control the power switching circuitry so as to cause the output current to switch between predetermined positive and negative values, and a value intermediate thereto.

Shown in FIG. 2 is one embodiment of the current-mode power-switching circuitry employing a center-tapped transformer configuration. Also shown is the typical circuitry used to generate the D.C. constant current $I_1$ for input to the current-mode power-switching circuitry.

The circuitry 1,2 of the D.C. current source is well known and is described here to aid in the understanding of the invention. Transistor $Q_4$ is alternately switched ON and OFF by the pulse width modulator 11 in order to generate the appropriate average voltage at terminal 12 which produces the current $I_1$. The pulse width modulator 11 is controlled by amplifier 10 which is used to compare the voltage across the current-sensing resistor $R_1$ to a D.C. reference voltage $E_r$. Since the voltage across the resistor $R_1$ is proportional to the current $I_1$, this circuit regulates the average value of $I_1$. The filtering action of inductor $L_1$ reduces the ripple on $I_1$ to an acceptably low level. The free-wheeling diode $D_4$ provides a path for the current $I_1$ to flow when $Q_4$ is in the OFF state. The inductive reactance of $L_1$ provides the necessary high output impedance when the variations in $V_1$ are faster than the speed of the feedback control loop. Accordingly, the D.C. current source may be a known D.C. current regulator having output impedance adequately high to insure the constancy of $I_1$.

The current-mode power-switching circuitry 3 of FIG. 2 will now be described. The collector of transistor $Q_1$ and diode $D_1$ are series connected to one end of the center-tapped primary winding 14 of output transformer 7, and the collector of transistor $Q_2$ and diode $D_2$ are series connected to the other end of the center-tapped winding 14. The center tap of winding 14 connects to the output terminal 13 of the D.C. current source. The collector of transistor $Q_3$ and diode $D_3$ are series connected to terminal 13. The emitters of $Q_1$, $Q_2$, and $Q_3$ connect to the other (negative) terminal 18 of the D.C. current source. Base drive signals $S_1$, $S_2$ and $S_3$, which are generated by the control logic 17, render $Q_1$, $Q_2$, and $Q_3$ conductive, respectively. Winding 16 on transformer 7 connects to the input D.C. voltage $E_b$ through the diode bridge 19. This connection provides a convenient means of limiting the voltage across windings 14 and 15 if such peak voltage limiting is desired. Limiting occurs when the voltage across winding 16 exceeds the magnitude of $E_b$. With this type of limiting, the energy associated with the excessive voltage is returned to the source $E_b$.

The control logic 17 renders one and only one of the transistors $Q_1$, $Q_2$, and $Q_3$ conductive at a time. When the current $I_1$ is to be "sent" to the load circuit through transformer 7 either $Q_1$ or $Q_2$ is rendered conductive. When $Q_1$ and $Q_2$ are both rendered nonconductive, $Q_3$ is rendered conductive so that the current $I_1$ can be short circuited to the common terminal 18. Diode $D_3$ allows point 13 to swing negative with respect to point 18 which can occur when the loads are reactive. Similarly, diodes $D_1$ and $D_2$ allow the ends of windings 14 to swing negative with respect to point 18.

Shown in FIG. 3 are various waveforms which will provide additional information about the operation of the current-mode power-switching circuitry. The waveforms are for a resistive load with the filter 8 omitted. The control signals $S_1$, $S_2$, and $S_3$ are generated by the control logic 17 with reference to the signal $V_s$. The control logic uses one of the well known sampling and modulation techniques such as pulse duration and pulse-position modulation to synthesize a waveform (for $I_2$) which approximates the waveform $V_s$. When it is necessary to attenuate the harmonics and distortion components generated, the filter 8 may be employed. For bandpass filtering a simple parallel-resonant circuit across winding 15 is often adequate. The complexity of the filter will depend on the particular requirements on distortion, phase shift, impedance, etc. It is to be noted that since feedback from the load circuitry is not employed there are no restrictions on the load or filter parameters from stability considerations.

Accordingly, from what has been said, the power-switching circuitry 3 may be considered as including two parallel paths having $I_1$ receiving inputs, each path including gate and diode means, the gate means having ON and OFF states controlled by the control means (17, for example) so that one path conducts output current $I_1$ when the other path is non-conductive, and so that the other path conducts $I_1$ output current when the one path is non-conductive. Also, a third path is connected in parallel with the two described paths, and includes gage and diode means, the latter gate means having ON and OFF states controlled so that the third path conducts $I_1$ shunt current when the first and second paths are non-conductive, and so that the third path is non-conductive when either of the first and second paths is conductive. All three paths may for example be connected in parallel between the $I_1$ source and a common terminal, as referred to.

Figure 4:
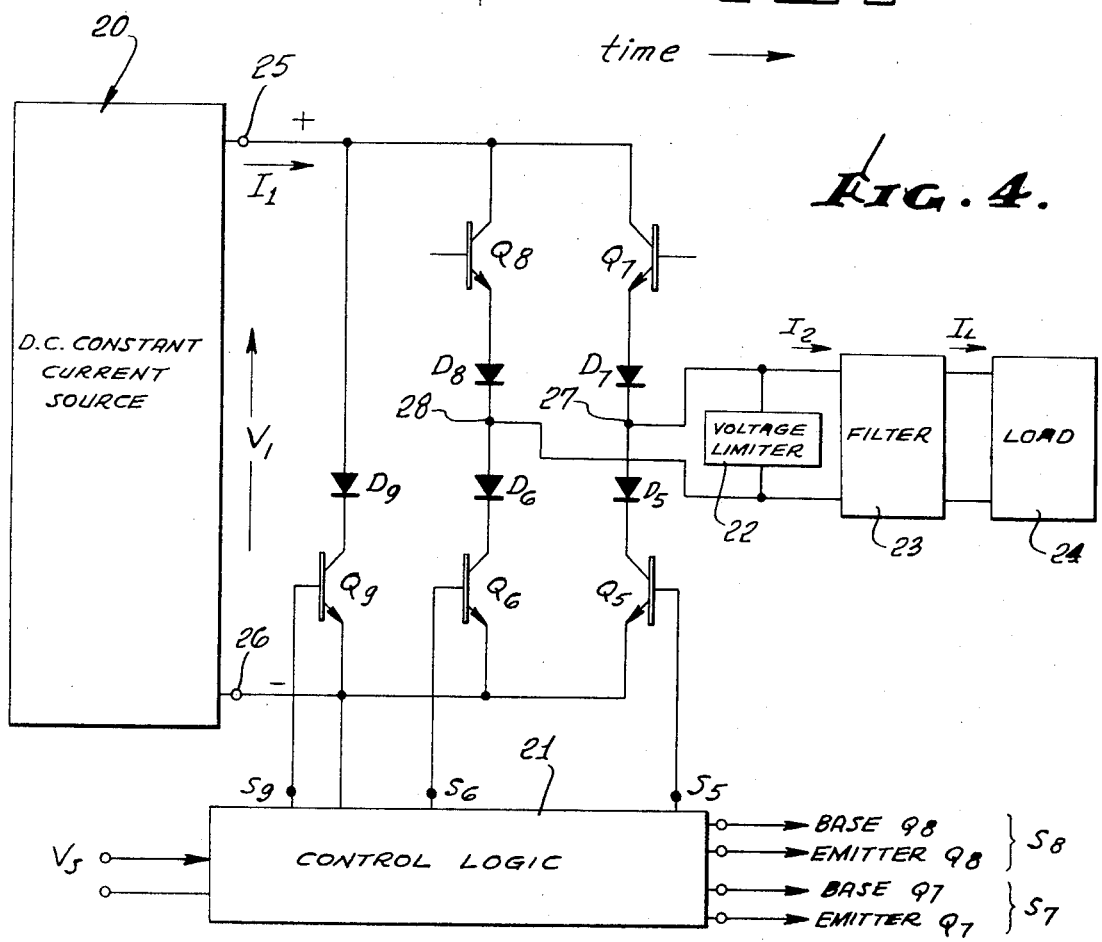

Shown in FIG. 4 is another circuit for the current-mode power-switching circuitry. This embodiment of the circuit uses transistors $Q_5$, $Q_6$, $Q_7$, and $Q_8$, and diodes $D_5$, $D_6$, $D_7$, and $D_8$, in a bridge connection. One side of the bridge is formed by the series connection of $Q_6$, $D_6$, $D_8$, and $Q_8$, the other side of the bridge is formed by the series connection of $Q_5$, $D_5$, $D_7$, and $Q_7$. These two series strings connect in parallel and connect to the output terminals 25 and 26 of a D.C. constant current source 20. The constant current source may be implemented with circuitry shown in FIG. 2. Transistor $Q_9$ and diode $D_9$ are series connected to terminals 25 and 26. The output terminals from the bridge are points 27 and 28; 27 is the common point between $D_5$ and $D_7$, and 28 is the common point between $D_6$ and $D_8$. Output terminals 27 and 28 connect to filter 23 which connects to load 24. A voltage-limiting circuit 22 may be connected between terminals 27 and 28 if voltage limiting is desired.

The control logic 21 controls the states of the transistors, and there are three states of operation:

(1) $Q_6$ and $Q_7$ ON and others OFF; (2) $Q_5$ and $Q_8$ ON and others OFF; (3) $Q_9$ ON and others OFF. In state (1) the current $I_1$ from the D.C. constant current source 20 flows into the filter and load circuits from the terminal 27. In state (2) the current $I_1$ flows into the filter and load circuits from the terminal 28, i.e. reversely. In state (3) the current $I_1$ flows through $D_9$ and $Q_9$. The diodes $D_5$, $D_6$, $D_7$, $D_8$ are used to insure that terminals 27 and 28 look like open terminals when $Q_9$ is ON.

A variation of the circuit shown in FIG. 4 is obtained by omitting $D_9$ and $Q_9$. In this case the three operational states are: (1) $Q_6$ and $Q_7$ ON and $Q_5$ and $Q_8$ OFF; (2) $Q_5$ and $Q_8$ ON and $Q_6$ and $Q_7$ OFF; (3) either $Q_5$ and $Q_7$ ON and $Q_6$ and $Q_8$ OFF, or $Q_6$ and $Q_8$ ON and $Q_5$ and $Q_7$ OFF. State 3 provides a short circuit across the current source 20 and open circuits the filter and load circuits.

The control logic 21 generates the appropriate drive signals to produce the three conduction states where the current $I_2$ into the filter and load circuits takes on the values $+I_1$, 0, or $-I_1$. By switching between these three possible states, the load current $I_L$ can be controlled. Typically the modulating pattern is such that $I_L$ approximates the time development of the reference signal $V_s$.

From what has been said regarding FIG. 4, "one path" having $I_1$ input as referred to may be regarded as including elements $Q_6$, $D_6$, $D_7$ and $Q_7$; and the second path having $I_1$ input may be regarded as including elements $Q_5$, $D_5$, $D_8$ and $Q_8$. The third path as referred to may be regarded as including elements $D_9$ and $Q_9$.

Further, the elements $Q_6$ and $D_6$ may be regarded as a first section of the one path, and elements $Q_7$ and $D_7$ as a second section of the one path; likewise, the elements $Q_5$ and $D_5$ may be regarded as a third section of the second path, and elements $Q_8$ and $D_8$ as a fourth section of the second path.

The control logic blocks 6, 17 and 21 typically contain a signal processor or modulator which generates three-state modulation, typically in the form of two logic signals which one may call "$X$" and "$Y$" (which are ordinary two-state logic signals) where $X$ indicates when current is to flow in the load and $Y$ indicates the polarity (plus or minus) of the current. If the "1" state of $X$ denotes current to flow in the load and the "1" state of $Y$ denotes the plus polarity, then it is straightforward to implement the base-drive circuitry to produce the various switching combinations described. In the circuit of FIG. 2, for example, the Boolean description for $S_1$, $S_2$, and $S_3$ in terms of $X$ and $Y$ would be $S_1 = X \cdot Y$,
$S_2 = X \cdot \overline{Y}$,
and $S_3 = \overline{X}$, where the "dot" denotes the AND logic operation, and the "bar" denotes the "complement." That is, $S_1$ is a "1" (on) state if $X$ and $Y$ are both 1; $S_2$ is a "1" state if $X$ is 1 and $Y$ is 0; and $S_3$ is a "1" state if $X$ is 0. For the bridge output circuitry of FIG. 4, there is more than one drive-logic condition which produces the zero output condition. The typical logic sequence would use only one of the possible drive conditions which produce the zero state. In FIG. 4, if the shunt path $Q_9$ and $D_9$ is employed then the drive-logic signals can be described in terms of the X and Y signals as follows:

$S_5 = X \cdot Y$,
$S_6 = X \cdot \overline{Y}$,
$S_7 = S_6$,
$S_8 = S_5$ and
$S_9 = \overline{X}$.

When path $Q_9$ and $D_9$ is omitted, then a suitable choice of drive conditions which meet the output requirements would be $S_5 = X \cdot Y + \overline{X}$,
$S_6 = X \cdot \overline{Y}$,
$S_7 = X \cdot \overline{Y} + \overline{X}$ and
$S_8 = X \cdot Y$ where the "+" denotes the OR logic operation.

The logic signals X and Y can be generated in a variety of ways depending on the desired relationship between the generalized reference signal $V_s$ and the output signal $I_L$. One of the better-known three-state output sequences is the sequence shown on page 312 of Principles of Inverter Circuits by B. D. Bedford and R. G. Hoft (Wiley, New York, 1964). This particular output sequence of pulses (which is equivalent to our example in FIG. 3 of this disclosure) is typically obtained through the modulation technique described for example in "Pulse Width Modulated Inverters for A.C. Motor Drives" by B. Mokrytzki (IEEE Transactions on Industry and General Application, Vol. IGA-3, No. 6, p.493, 1967). In this example the absolute value of a sinewave reference voltage is compared with a triangular voltage waveform which has a frequency several times the frequency of the sinewave and which is typically synchronized with the sinewave. The output of a comparator which compares the two signals would for example be what we have defined as logic signal $X$. In this example, the polarity of the sinewave reference determined the polarity of the converter output. Thus the output of a second comparator which compares the sinewave to zero voltage would be what we have defined as logic signal $Y$.

We claim:

1. In circuitry for controlling a load current, without feedback, the combination comprising:
   a. a source of substantially constant current $I_1$,
   b. power switching circuitry connected to receive $I_1$ and to produce an output current a version of which is to be supplied to a load, and
   c. control means connected to control the power switching circuitry so as to cause the output current to switch between predetermined positive and negative values, and a value intermediate thereto,
   d. said power switching circuitry including two parallel paths having $I_1$ receiving inputs, each path including gate and diode means, the gate means having ON and OFF states controlled by said control means so that one path conducts output current $I_1$ when the other path is non-conductive, and so that said other path conducts $I_1$ output current when said one path is non-conductive, and there being a third path having an $I_1$ receiving input and connected in parallel relation with said two parallel paths, said third path including gate and diode means, said last named gate means having ON and OFF states controlled by said control means so that said third path conducts $I_1$ shunt current when the first and second paths are non-conductive, and so that the third path in non-conductive when either of the first and second paths is conductive.

2. The combination of claim 1 including a common terminal, and wherein said first, second and third paths are connected between said $I_1$ source and said common terminal.

3. The combination of claim 2 including an output transformer having a center tapped input winding to which said $I_1$ source is connected, the first path connected between one end of said input winding and the common terminal, and the second path connected between the opposite end of the input winding and said common terminal.

4. The combination of claim 1 including said load connected to receive said output current version.

5. The combination of claim 3 wherein the output transformer has an output winding, and including said load to which said output winding is electrically connected.

6. The combination of claim 5 including a filter connected between said output winding and said load.

7. The combination of claim 5 wherein the output transformer has a third winding, and voltage application means connected across the third winding to limit the voltage produced across the output winding.

8. The combination of claim 1 wherein said gate means in said paths comprise transistors having bases effectively connected with said control means to be biased thereby.

9. The combination of claim 1 wherein said one path includes first and second sections, and said other path includes third and fourth sections, said second and third sections also connected in series, and said first and fourth sections also connected in series.

10. The combination of claim 9 including output current terminals one of which is connected between said second and third sections, and the other of which is connected between said first and fourth sections.

11. The combination of claim 10 wherein each of said sections includes gate and diode means.

12. Combination of claim 10 wherein said first, second, third, and fourth sections have alternative controlled states as follows:
  a. first and fourth conductive, and second and third non-conductive;
  b. second and third conductive, and first and fourth non-conductive;
  c. first and second conductive, and third and fourth non-conductive;
  d. third and fourth conductive; and first and second non-conductive.

* * * * *